US011523304B2

United States Patent
Tachibana

(10) Patent No.: US 11,523,304 B2
(45) Date of Patent: Dec. 6, 2022

(54) COMMUNICATION APPARATUS, METHOD OF CONTROLLING COMMUNICATION APPARATUS, AND STORAGE MEDIUM

(71) Applicant: CANON KABUSHIKI KAISHA, Tokyo (JP)

(72) Inventor: Hideaki Tachibana, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/154,622

(22) Filed: Jan. 21, 2021

(65) Prior Publication Data

US 2021/0235321 A1  Jul. 29, 2021

(30) Foreign Application Priority Data

Jan. 27, 2020 (JP) .............................. JP2020-010510

(51) Int. Cl.
| | | |
|---|---|---|
| *H04W 28/08* | (2009.01) | |
| *H04W 74/08* | (2009.01) | |
| *H04W 84/12* | (2009.01) | |

(52) U.S. Cl.
CPC ... *H04W 28/0808* (2020.05); *H04W 74/0816* (2013.01); *H04W 84/12* (2013.01)

(58) Field of Classification Search
CPC ..... H04W 28/08; H04W 74/08; H04W 74/04; H04W 74/06; H04W 84/12
See application file for complete search history.

(56) References Cited

U.S. PATENT DOCUMENTS

| | | | | |
|---|---|---|---|---|
| 10,542,486 | B1* | 1/2020 | Strater | H04W 84/20 |
| 2012/0014269 | A1* | 1/2012 | Ray | H04W 74/006 |
| | | | | 370/252 |
| 2016/0309508 | A1* | 10/2016 | Li | H04W 74/085 |
| 2017/0118770 | A1* | 4/2017 | Cherian | H04W 74/08 |
| 2018/0027561 | A1* | 1/2018 | Segev | H04L 5/0069 |
| | | | | 370/329 |
| 2018/0191541 | A1* | 7/2018 | Fang | H04W 72/0446 |
| 2018/0255589 | A1* | 9/2018 | Patil | H04W 52/50 |
| 2018/0310338 | A1 | 10/2018 | Li et al. | |
| 2019/0289633 | A1* | 9/2019 | Fang | H04L 27/2601 |
| 2020/0092881 | A1* | 3/2020 | Nezou | H04W 72/1257 |
| 2020/0267636 | A1* | 8/2020 | Cavalcanti | H04W 74/0808 |

* cited by examiner

*Primary Examiner* — Kent Krueger
(74) *Attorney, Agent, or Firm* — Canon U.S.A., Inc. IP Division

(57) ABSTRACT

A communication apparatus acquires information about a station connected to a first access point, determines whether the number of stations connected to the first access point is greater than or equal to a predetermined number based on the acquired information about the station, and controls an operation of the first access point such that in a case where the communication apparatus determines that the number of stations connected to the first access point is greater than or equal to the predetermined number, a frame instructing the station connected to the first access point to transmit uplink data is transmitted to the station connected to the first access point, whereas in a case where the communication apparatus determines that the number of stations connected to the first access point is less than the predetermined number, the frame is not transmitted.

15 Claims, 6 Drawing Sheets

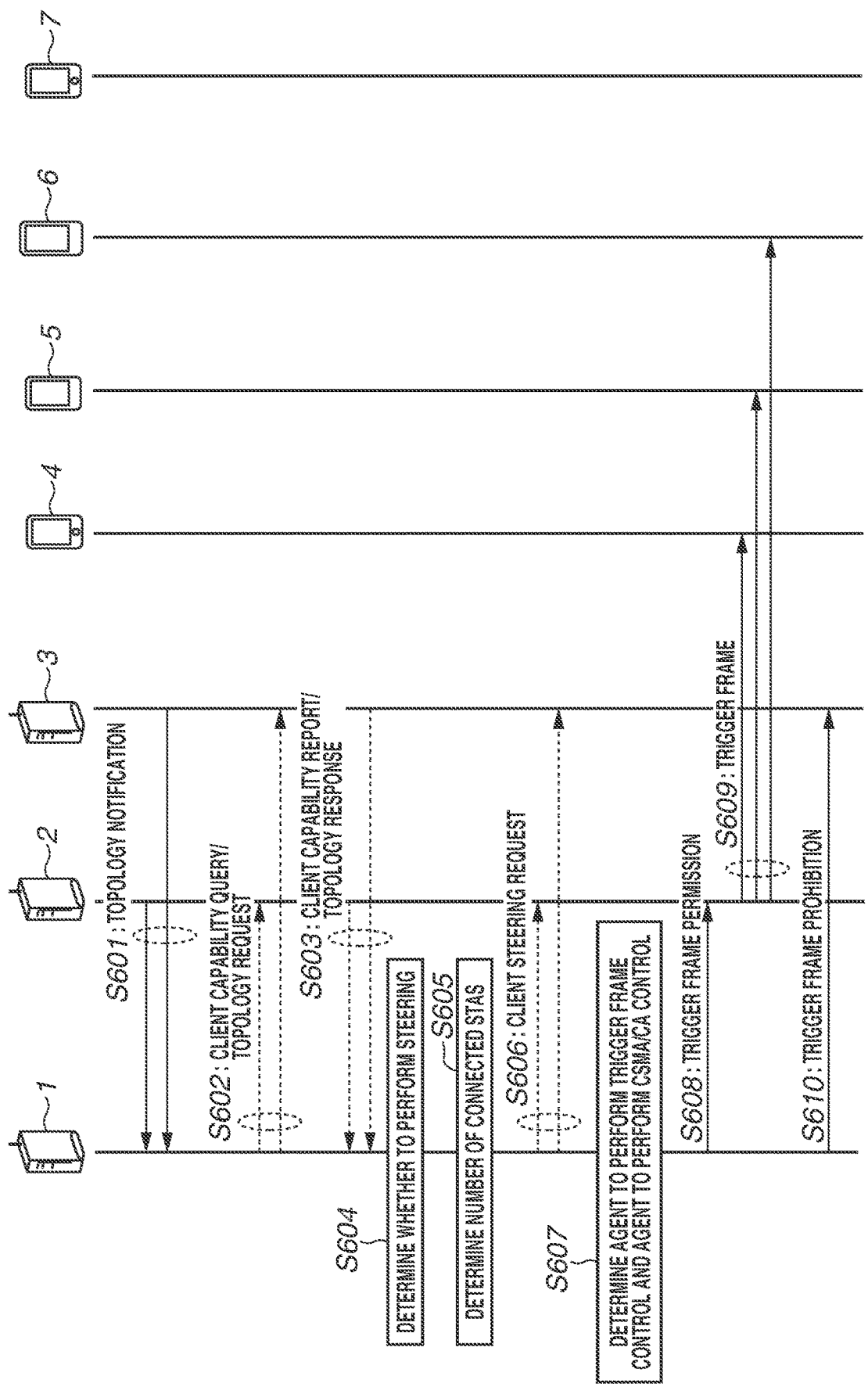

COMMUNICATION APPARATUS, METHOD OF CONTROLLING COMMUNICATION APPARATUS, AND STORAGE MEDIUM

BACKGROUND OF THE INVENTION

Field of the Invention

The present disclosure relates to communication apparatuses operable as access points in wireless networks.

Description of the Related Art

The Wi-Fi EasyMesh® standard developed by Wi-Fi Alliance® defines various types of control in a network formed by a plurality of access points (hereinafter, also referred to as "APs"). Hereinafter, a network formed by such a plurality of APs in cooperation will be referred to as "multi-AP network".

In the Wi-Fi EasyMesh® standard, an AP forming a multi-AP network acquires various types of information from another AP and realizes efficient network control between a plurality of APs using the information.

Each AP forming the multi-AP network operates either as a multi-AP controller (hereinafter, referred to as "controller") or as a multi-AP agent (hereinafter, referred to as "agent").

The controller is an AP that controls other APs and controls the entire multi-AP network. In contrast, the agent is an AP managed by the controller, and the agent notifies the controller of various types of network information.

The controller controls the multi-AP network by issuing instructions to the agent based on the network information notified by the agent using protocols defined in the Institute of Electrical and Electronics Engineers (IEEE) 1905.1 standard. The network information notified to the controller by the agent includes network topology information and discovery information.

The controller also performs proxy control on data communication between the multi-AP network and public lines and manages data traffic.

United States Patent Publication Application No. 2018/0310338 discusses an access method in which a plurality of stations (STAs) simultaneously executes random access on a plurality of channels on a network compliant with the IEEE 802.11ax standard. Specifically, in the technique discussed in United States Patent Publication Application No. 2018/0310338, an AP transmits a trigger frame carrying uplink transmission resource information to a network based on a frame carrying condition information about uplink transmission from the STAs to the AP. The condition information is transmitted from the STAs. In a case where the trigger frame is not received within an agreed period, the STAs access the channels using a conflict access method based on a carrier sense multiple access/collision avoidance (CSMA/CA) method.

As discussed in United States Patent Publication Application No. 2018/0310338, in the IEEE 802.11ax standard, conflict access in uplink data transmission from the plurality of STAs to the AP is controlled by using trigger frames that trigger uplink data transmission from each of the plurality of STAs.

Specifically, the AP receives an uplink transmission capability report, such as buffer sizes of the STAs, transmitted from the STAs (terminal). The AP transmits trigger frames to the STAs based on the received report, thereby triggering uplink data transmission from the STAs.

A great number of IEEE 802.11ax-compliant STAs can connect to the Wi-Fi EasyMesh® multi-AP network. However, in a case where each of a plurality of APs controls the trigger frame transmission described above, the trigger frame control performed by the APs becomes overhead, the channel use efficiency decreases, and the performance of the wireless network may decrease.

Even in a case where uplink data transmission from the STAs is not likely to conflict and the effect of conflicting access control using trigger frames is small, the load of trigger frame control performed by the APs is not reduced, and the performance of the wireless network may decrease.

SUMMARY OF THE INVENTION

According to various embodiments of the present disclosure, a communication apparatus includes an acquisition unit configured to acquire information about a station connected to a first access point of a plurality of access points in a wireless network including the plurality of access points, a determination unit configured to determine whether the number of stations connected to the first access point is greater than or equal to a predetermined number based on the information about the station acquired by the acquisition unit, and a control unit configured to control an operation of the first access point such that in a case where the determination unit determines that the number of stations connected to the first access point is greater than or equal to the predetermined number, a frame instructing the station connected to the first access point to transmit uplink data is transmitted to the station connected to the first access point, whereas in a case where the determination unit determines that the number of stations connected to the first access point is less than the predetermined number, the frame is not transmitted.

Further features will become apparent from the following description of exemplary embodiments with reference to the attached drawings.

BRIEF DESCRIPTION OF THE DRAWINGS

FIG. 6 is a sequence diagram illustrating an example of a processing sequence between communication apparatuses in a communication network according to the second exemplary embodiment.

DESCRIPTION OF THE EMBODIMENTS

Various embodiments of the present disclosure provide a communication apparatus that prevents a decrease in performance of a wireless network formed by a plurality of access points (APs) in uplink data transmission from a plurality of terminals to the APs in the wireless network.

Various exemplary embodiments of the present disclosure will be described in detail below with reference to the attached drawings. Each exemplary embodiment described below is a mere example of implementation of the present invention and should be modified or changed as appropriate to a configuration of an apparatus to which the present invention is applied or various conditions, and the present invention is not limited to the exemplary embodiments described below. Further, not every combination of features described in the exemplary embodiments is always essential to a technical solution of embodiments of the present disclosure.

While a communication apparatus supporting the Wi-Fi EasyMesh® standard, which allows a multi-AP network formed by a plurality of (APs), will be described below as an example, the present exemplary embodiment is not limited to this example. For example, a communication apparatus can employ another communication method that enables wireless communication on a multi-AP network that is a wireless network formed by a plurality of APs. Alternatively, a communication method for a wireless network formed by a single AP can be employed for the communication apparatus. The Wi-Fi EasyMesh® standard is based on the specification published as "Multi-AP Specification Version 1.0" by Wi-Fi Alliance® and subsequent specifications.

<Network Configuration according to First Exemplary Embodiment>

In a first exemplary embodiment, an AP operating as an agent determines which one of an uplink control method using trigger frames and another uplink control method is to be performed. Examples of the other uplink control method include, but are not limited to, carrier sense multiple access/collision avoidance (CSMA/CA). The term "uplink control" refers to uplink channel conflict control in a case where a plurality of stations (STAs) simultaneously connects to an AP and transmits data using uplinks.

Figure 1:
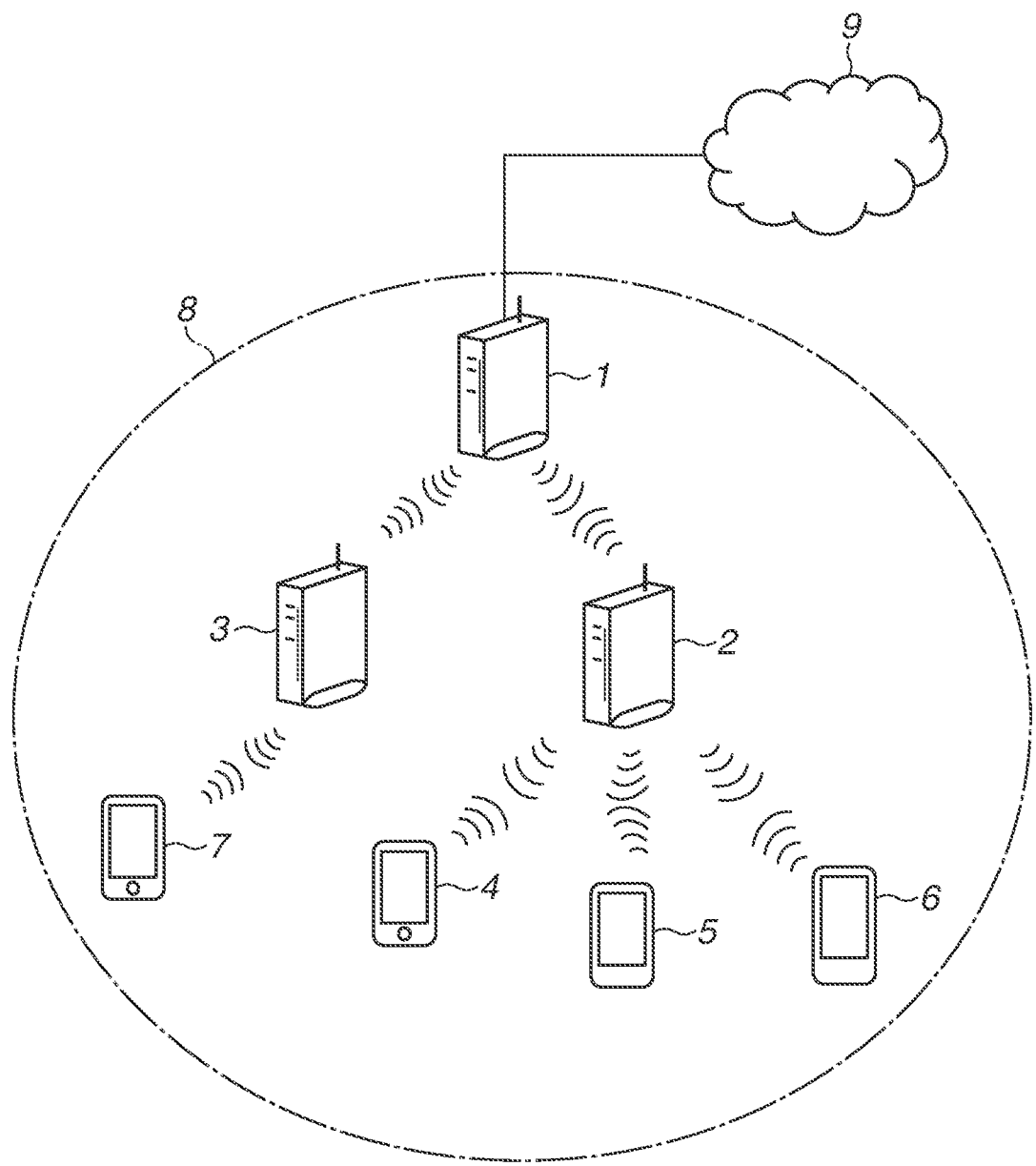
FIG. 1 illustrates an example of a network configuration of a communication system according to a first exemplary embodiment.

FIG. 1 illustrates an example of a network configuration of a communication system according to the present exemplary embodiment.

The communication system illustrated in FIG. 1 includes communication apparatuses 1 to 7 connected to a multi-AP network 8 and performs wireless communication on the multi-AP network 8. The multi-AP network 8 is a network that includes one or more APs.

The communication apparatuses 1, 2, and 3 each operate as an AP of a wireless local area network (LAN) based on the Institute of Electrical and Electronics Engineers (IEEE) 802.11 series standards. The communication apparatuses 4 to 7 each operate as a station (STA) that connects to a wireless LAN established by the communication apparatus 2 or 3 being an AP. Hereinafter, the communication apparatuses 1, 2, and 3 will also be referred to as "AP 1", "AP 2", and "AP 3", respectively, and the communication apparatuses 4, 5, 6, and 7 will also be referred to as "STA 4", "STA 5", "STA 6", and "STA 7", respectively.

The communication apparatus 1, which is a wireless base station, establishes a wireless LAN network and connects to the communication apparatuses 2 and 3, which are other APs. The communication apparatuses 2 and 3 each establish a wireless LAN connection with the communication apparatus 1 as a station (STA) with respect to the communication apparatus 1 using backhaul communication connecting an access line and a core network. The communication apparatuses 1 to 3, which are APs, can be any communication apparatuses having an access point function and do not have to be a dedicated device configured to provide an access point.

In FIG. 1, the communication apparatus 1 is connected to a wide area network (WAN) 9 and operates as a gateway that relays communication of the other communication apparatuses 2 to 7 and connects the other communication apparatuses 2 to 7 to the WAN 9. Instead of the communication apparatus 1, the communication apparatus 2 or 3 can operate as a gateway. The communication apparatuses 1 to 3 can be configured to perform wired communication in addition to or in place of wireless communication.

The Wi-Fi EasyMesh® standard defines a multi-AP network as consisting of one controller and one or more agents.

In the present exemplary embodiment, the communication apparatus 1, which is an AP, plays a role as a controller having a function of controlling other APs on the multi-AP network 8 to control the entire multi-AP network 8.

On the other hand, the communication apparatuses 2 and 3, which are the other APs that do not play the role as a controller, are under the control of the controller and play a role as an agent having a function of notifying the controller of network information.

In FIG. 1, the communication apparatuses 4 to 6, which are STAs, each establish a wireless LAN connection with the communication apparatus 2, which is an AP, by fronthaul communication connecting a parent station and a child station. Similarly, the communication apparatus 7, which is an STA, establishes a wireless LAN connection with the communication apparatus 3, which is an AP, by fronthaul communication.

The controller, for example, controls connection channels and transmission power of an agent by transmitting predetermined control messages to the agent. The controller moves an agent to a different basic service set (BSS) under the control of a different AP, controls steering such as STA roaming, controls data traffic, and performs network assessment.

Further, network information notified to the controller by an agent includes capability information about the agent, and capability information about STAs and APs connected to the agent.

The network information notified to the controller by an agent can further include information about wireless LAN connection channels, information about radio interference, link information about STAs (e.g., link connection/disconnection notifications), and/or topology information for notifying changes in network topologies. The network information can further include metrics information about beacon frames.

An AP that plays the role as a controller can simultaneously have the function as an agent. The communication apparatuses 1 to 3 illustrated in FIG. 1 are described as each having both the function as a controller and the function as an agent in the present exemplary embodiment. However, the communication apparatuses 1 to 3 each can only have one of the function as a controller and the function as an agent.

The multi-AP network 8 illustrated in FIG. 1 is a wireless LAN network that supports the Wi-Fi EasyMesh® standard and IEEE 802.11ax. The multi-AP network 8 is established by the communication apparatus 1, which is a controller AP, and formed by the communication apparatuses 2 and 3, which are agent APs, and the communication apparatus 1. The Wi-Fi EasyMesh® standard and IEEE 802.11ax standard are mere examples, and any other standards including similar functions can be employed. The multi-AP network 8 is also applicable to, for example, the IEEE 802.11be standard, which is a successor to the IEEE 802.11ax standard, and any subsequent IEEE 802.11 series standards.

The multi-AP network 8 can be a network that supports wireless universal serial bus (wireless USB), Multiband Orthogonal frequency-division multiplexing Alliance (MBOA), or Bluetooth®. The multi-AP network 8 can also be a network that supports Ultra-wideband (UWB), ZigBee®, or Near-Field-Communication (NFC). UWB includes wireless USB, wireless 1394, and WiMedia® Network (WINET).

The communication apparatuses 1 to 3 illustrated in FIG. 1 can be any communication apparatus that can operate as an AP supporting the Wi-Fi EasyMesh® standard and has a hardware and functional configuration described below with reference to FIG. 2. Examples of the communication apparatuses 1 to 3 include, but are not limited to, wireless LAN routers, personal computers (PCs), tablet terminals, smartphones, television sets, printers, copying machines, and projectors. The communication apparatuses 1 to 3 can also be different devices from one another. Similarly, the communication apparatuses 4 to 7 illustrated in FIG. 1 can be any communication apparatuses that can operate as an STA supporting the Wi-Fi EasyMesh® standard, and device types are not limited.

<Hardware and Functional Configuration of Communication Apparatus>

Figure 2:
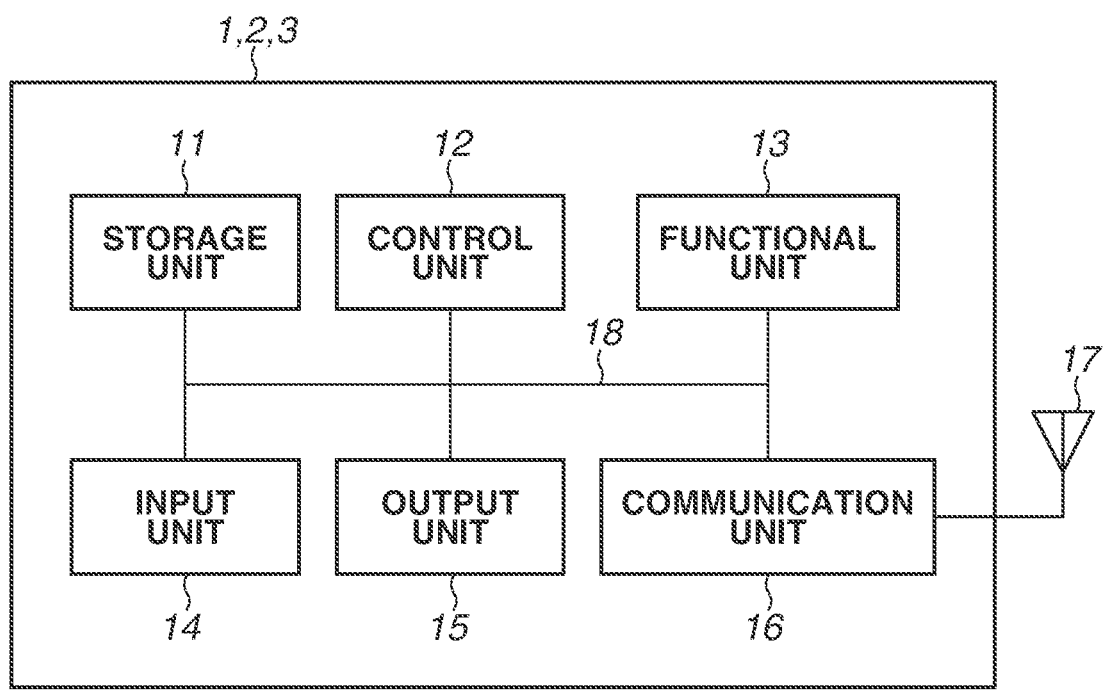
FIG. 2 is a block diagram illustrating an example of a hardware and functional configuration of a communication apparatus according to the first exemplary embodiment.

FIG. 2 illustrates an example of a hardware and functional configuration of the communication apparatuses according to the present exemplary embodiment. While the communication apparatus 1 in FIG. 1 will be described below as a communication apparatus having the hardware and functional configuration illustrated in FIG. 2, the communication apparatuses 2 and 3 also have the hardware and functional configuration illustrated in FIG. 2.

The communication apparatus 1 illustrated in FIG. 2 includes a storage unit 11, a control unit 12, a functional unit 13, an input unit 14, an output unit 15, a communication unit 16, and an antenna 17.

The units of the communication apparatus 1 in FIG. 2 are communicably connected to one another via a system bus 18. The communication apparatus 1 does not have to include every one of the above-described modules. The communication apparatus 1 can further include another module in addition to the configuration illustrated in FIG. 2.

The storage unit 11 includes a single or plurality of memories, such as a read-only memory (ROM) and a random access memory (RAM), and stores programs for executing various operations described below and information, such as communication parameters, for wireless communication. Examples of storage mediums that can be used as the storage unit 11 besides ROMs and RAMs are flexible disks, hard disks, optical disks, compact disk (CD) ROMs (CD-ROMs), CD-recordables (CD-Rs), magnetic tapes, non-volatile memory cards, and digital versatile discs (DVDs). The storage unit 11 can include a plurality of memories.

The control unit 12 includes a single or plurality of processors, such as a central processing unit (CPU) and a micro processing unit (MPU). The control unit 12 comprehensively controls the entire communication apparatus 1 by executing programs stored in the storage unit 11.

In the present exemplary embodiment, the control unit 12 has both the function as a controller and the function as an agent in the multi-AP network 8. The communication apparatus 1 performs at least one of the function as a controller and the function as an agent based on settings and operations on the communication apparatus 1.

The control unit 12 can enable and disable each of the function as a controller and the function as an agent separately.

In a case where the communication apparatus 1 operates as a controller in the multi-AP network 8, the communication apparatus 1 controls the multi-AP network 8 by issuing instructions to an agent based on network topology information and discovery information received from the agent.

The network topology information can be acquired from, for example, topology notification messages and topology response messages defined in the IEEE 1905.1 standard. The discovery information can be acquired from, for example, AP-autoconfiguration search messages and AP-autoconfiguration response messages defined in the IEEE 1905.1 standard. The above-described messages are messages based on protocols of the Wi-Fi EasyMesh® standard.

The controller transmits client association control request messages defined as multi-AP control messages in the Wi-Fi EasyMesh® standard based on the topology information and the discovery information. This prohibits an STA from connecting to another BSS in the multi-AP network 8, steers (roams) an STA explicitly to a predetermined BSS, and realizes efficient steering of STAs between BSSs.

In a case where the communication apparatus 1 does not play the role as a controller, the communication apparatus 1 does not have to have the function as a controller. Similarly, in a case where the communication apparatus 1 does not play the role as an agent, the communication apparatus 1 does not have to have the function as an agent.

The control unit 12 can control the entire communication apparatus 1 in cooperation with a program and an operating system (OS) stored in the storage unit 11. The control unit 12 controls the functional unit 13 to perform predetermined processing.

The functional unit 13 performs predetermined processing, such as printing and projection, under the control of the control unit 12. The functional unit 13 can include hardware for execution of predetermined processing performed by the communication apparatus 1. For example, in a case where the communication apparatus 1 is a printer, the functional unit 13 is a printing unit and the functional unit 13 performs printing processing. In this case, data on which the functional unit 13 performs printing processing can be data stored in the storage unit 11 or data transmitted from another communication apparatus via the communication unit 16 described below.

The input unit 14 receives various user operations via, for example, a pointing device (e.g., a mouse), audio input, and button operations.

The output unit 15 provides various types of output to a user. The output from the output unit 15 can include at least one of the following examples: a display on a light emitting diode (LED), a display on a screen, audio output from a speaker, and vibration output. Alternatively, both the input unit 14 and the output unit 15 can be realized by a single module, such as a touch panel.

The communication unit 16 controls wireless LANs supporting the IEEE 802.11 series standards, which are data link layer protocols, and wired communication, such as wired LANs supporting the IEEE 802.3 standard. The communication unit 16 further controls communication based on Internet Protocol (IP), which is a network layer communication protocol.

In the present exemplary embodiment, the communication unit 16 performs protocols based on the IEEE 1905.1 standard on communication based on the IEEE 802.11 or IEEE 802.3 standard. The communication unit 16 further controls the controller and/or an agent based on the Wi-Fi EasyMesh® standard. The IEEE 1905.1 standard is a standard that defines a protocol at a hierarchy between the data link layer and the network layer.

The communication unit 16 controls the antenna 17 and transmits and receives wireless signals for wireless communication.

<Process Performed by Communication Apparatus as Agent>

Figure 3:
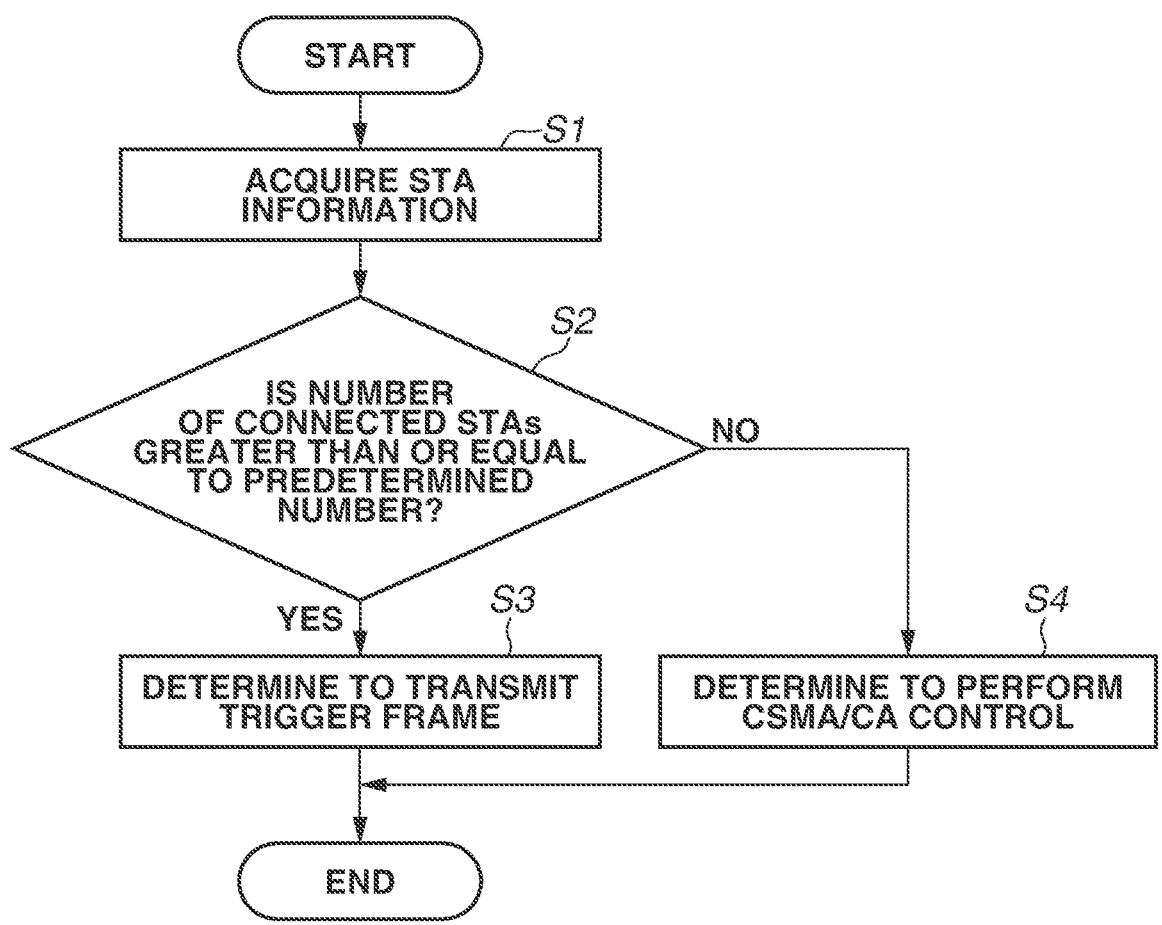
FIG. 3 is a flowchart illustrating an example of an uplink control process executed in a case where the communication apparatus according to the first exemplary embodiment operates as an agent in a multi-access point (multi-AP) network.

FIG. 3 is a flowchart illustrating an example of an uplink control process performed in a case where a communication apparatus being an AP operates as an agent in the multi-AP network 8. While the communication apparatus 2 operating as an agent will be described below for convenience, the communication apparatus 3 instead of the communication apparatus 2 can perform the process illustrated in FIG. 3 as an agent.

In a case where the communication apparatus 2 is turned on, the control unit 12 reads a program stored on the storage unit 11 of the communication apparatus 2 and performs the read program to thereby realize the steps illustrated in FIG. 3. Alternatively, the steps in FIG. 3 can be performed in a case where a user operation is performed to change to a predetermined operation mode, such as a communication setting mode, or a case where a predetermined application, such as a communication setting application, is activated, instead of the case where the communication apparatus 2 is turned on.

Further, at least part of the flowchart in FIG. 3 can be realized by hardware. In a case where part of the flowchart in FIG. 3 is to be realized by hardware, for example, a predetermined compiler can be used to automatically generate a dedicated circuit on a field programmable gate array (FPGA) from the program that realizes the steps. Similarly to the FPGA, a gate array circuit can be formed to realize part of the flowchart illustrated in FIG. 3 as hardware. Part of the flowchart in FIG. 3 can also be realized by an application-specific integrated circuit (ASIC).

In this case, each block of the flowchart illustrated in FIG. 3 can be considered as a hardware block. Alternatively, a plurality of blocks can collectively be configured as a single hardware block, or a single block can be configured as a plurality of hardware blocks.

In step S1, the control unit 12 of the communication apparatus 2 acquires information about each communication apparatus that is an STA connected to the communication apparatus 2 via a BSS established by the communication apparatus 2 being an AP, via the communication unit 16. Hereinafter, the information about each STA acquired by the communication apparatus 2 in the step S1 will be referred to as "STA information".

Specifically, the control unit 12 of the communication apparatus 2 can acquire STA information about each STA (STAs 4 to 6 in FIG. 1) connected using a protocol defined in the IEEE 1905.1 standard. Alternatively, the control unit 12 of the communication apparatus 2 can acquire STA information about each STA to be connected by using a control packet based on the IEEE 802.11 series standards.

The control unit 12 of the communication apparatus 2 can also receive an STA information acquisition request from a user via the input unit 14 or can read STA information stored temporarily in advance on the storage unit 11. The input unit 14 can be a hardware button or a button on a user interface (UI) displayed on the output unit 15.

In step S2, the control unit 12 of the communication apparatus 2 determines whether the number of STAs connected to the communication apparatus 2 is greater than or equal to a predetermined number based on the STA information acquired in step S1.

In a case where the number of STAs connected to the communication apparatus 2 is greater than or equal to the predetermined number (YES in step S2), the processing proceeds to step S3. In a case where the number of STAs connected to the communication apparatus 2 is smaller than the predetermined number (NO in step S2), the processing proceeds to step S4.

The predetermined number of STAs referred to in step S2 can be statically registered in advance in the storage unit 11 of the communication apparatus 2. Alternatively, the value of the predetermined number can be changed dynamically based on a communication status of the communication unit 16.

In step S3, the control unit 12 of the communication apparatus 2 determines to transmit a trigger frame defined in the IEEE 802.11ax standard to every STA connected to the communication apparatus 2. The communication unit 16 of the communication apparatus 2 transmits a trigger frame to each STA connected to the communication apparatus 2 to provide a trigger of an uplink data apparatus.

The trigger frame transmitted in step S3 by the communication unit 16 of the communication apparatus 2 can include the number of spatial streams allocated to each STA, orthogonal frequency division multiple access (OFDMA) frequencies, the resource unit (RU) size of sub-channels of a divided channel band, and STA power control information.

In contrast, in step S4, the control unit 12 of the communication apparatus 2 determines to perform uplink control using another uplink control method. Examples of the other uplink control method include, but are not limited to, the CSMA/CA method.

In step S4, the control unit 12 of the communication apparatus 2 can notify each STA connected to the communication apparatus 2 that uplink control is to be performed using the CSMA/CA method.

<Control Sequence of Entire Communication System in Multi-AP Network>

Figure 4:
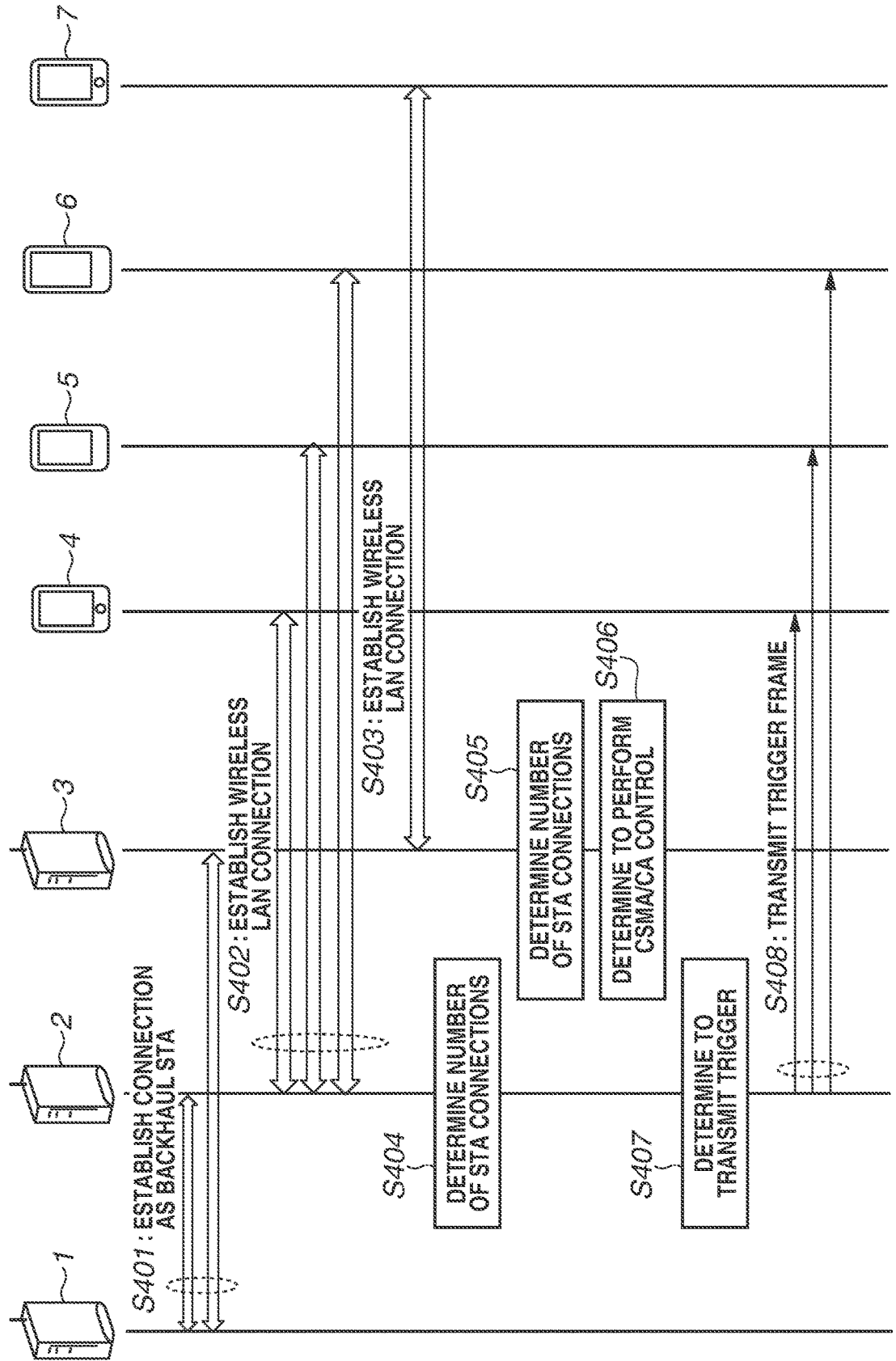
FIG. 4 is a sequence diagram illustrating an example of a processing sequence between communication apparatuses in a communication network according to the first exemplary embodiment.

FIG. 4 illustrates an example of a control sequence between the communication apparatuses in a case where each agent in the multi-AP network 8 determines which one of the uplink control method using a trigger frame and the other uplink control method (e.g., CSMA/CA) is to be executed.

In FIG. 4, the communication apparatus 1 is preset to function as a controller, and the communication apparatuses 2 and 3 are preset to each function as an agent. In a case where an AP is activated as a controller or an agent, a predetermined function is activated based on the Wi-Fi EasyMesh® standard.

Specifically, in a case where an AP is activated as an agent, to join the multi-AP network 8, the AP activates an STA function of a multi-AP device referred to as backhaul STA and starts processing to join the multi-AP network 8. In a case where an AP is activated as a controller, the AP activates an AP function of the multi-AP device referred to as fronthaul AP and waits for a connection from another STA apparatus or a backhaul STA activated by another AP.

In step S401, the APs 2 and 3 activated as an agent each establish a wireless LAN connection with the AP 1 activated as a controller via the communication unit 16 as a backhaul STA by backhaul communication.

In step S402, the AP 2 establishes a wireless LAN connection with each of the STAs 4 to 6 via the communication unit 16 by fronthaul communication.

In step S403, the AP 3 similarly establishes a wireless LAN connection with the STA 7 via the communication unit 16 by fronthaul communication.

After connected to the STAs 4 to 7, the APs 2 and 3 acquire STA information about the STAs connected to the APs 2 and 3, respectively, via each communication unit 16.

In step S404, the AP 2 determines whether the number of STAs connected to the AP 2 is greater than or equal to the predetermined number.

In step S405, the AP 3 similarly determines whether the number of STAs connected to the AP 3 is greater than or equal to the predetermined number.

While the predetermined number for the number of STA connections to each AP will be described as being three, the present exemplary embodiment is not limited to the number described below.

In step S406, since the number of STAs connected to the AP 3 is one, the AP 3 determines that the number of STA connections is neither greater than nor equal to the predetermined number, and the AP 3 determines to perform uplink control using the CSMA/CA method, which is the other uplink control method.

In step S407, since the number of STAs connected to the AP 2 is three, the AP 2 determines that the number of STA connections is greater than or equal to the predetermined number, and the AP 2 determines to perform uplink control by transmitting trigger frames based on IEEE 802.11ax.

In step S408, the AP 2 transmits a trigger frame to each of the STAs 4 to 6.

In contrast, the AP 3 does not transmit a trigger frame to the AP 7. In other words, the AP 3 inhibits trigger frame transmission. The AP 3 can transmit a notification to the STA 7 to perform uplink control using the CSMA/CA method.

As described above, according to the present exemplary embodiment, a communication apparatus operating as an agent acquires information about STAs connected to the communication apparatus. In a case where the number of STAs connected to the communication apparatus is greater than or equal to the predetermined number, the communication apparatus performs uplink control by transmitting trigger frames to the connected STAs.

On the other hand, in a case where the number of STAs connected to the communication apparatus is less than the predetermined number, the communication apparatus inhibits trigger frame transmission to each STA and performs uplink conflict control using the other uplink control method (e.g., CSMA/CA method). This reduces the processing load on the AP in generating a trigger frame corresponding to uplink transmission capability of an STA for every STA, transmitting the generated trigger frame to every STA, and processing a feedback frame from each STA.

Thus, a decrease in performance of a wireless network including a plurality of APs in uplink data transmission from a plurality of terminals to the APs is effectively prevented, and the network performance is optimized.

A second exemplary embodiment will be described in detail below with reference to FIGS. 5 and 6 only in differences from the first exemplary embodiment.

In the first exemplary embodiment, each agent in the multi-AP network 8 determines which one of the uplink control method using a trigger frame and the other uplink control method is to be executed. Alternatively, in the present exemplary embodiment, the controller in the multi-AP network 8 determines which one of the uplink control method using a trigger frame and the other uplink control method (e.g., the CSMA/CA method) is to be executed.

Since each communication apparatus according to the second exemplary embodiment has a hardware and functional configuration similar to those of the communication apparatuses according to the first exemplary embodiment described above with reference to FIG. 2, redundant descriptions thereof are omitted.

<Process Performed by Communication Apparatus as Controller>

Figure 5:
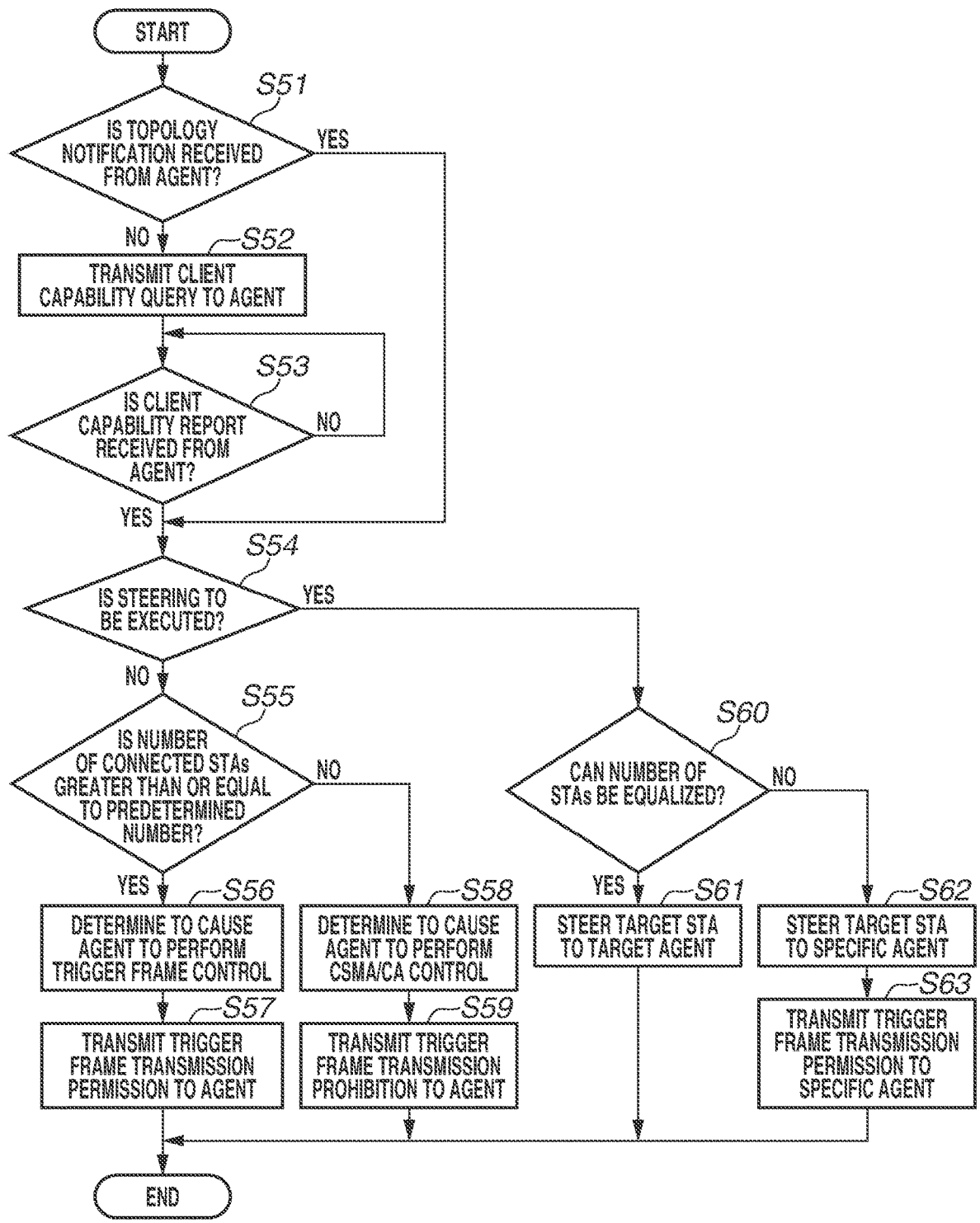
FIG. 5 is a flowchart illustrating an example of an uplink control process executed in a case where a communication apparatus according to a second exemplary embodiment operates as a controller in a multi-AP network.

FIG. 5 is a flowchart illustrating an example of an uplink control process performed in a case where a communication apparatus being an AP operates as a controller in the multi-AP network 8. While the communication apparatus 1 illustrated in FIG. 1 operating as a controller will be described below for convenience, the communication apparatus 2 or 3 instead of the communication apparatus 1 can perform the process illustrated in FIG. 5 as a controller.

In step S51, the control unit 12 of the communication apparatus 1 activated as a controller acquires STA information about each STA connected to the communication apparatus 2 via the BSS established by the communication apparatus 2 and STA information about each STA connected to the communication apparatus 3 via a BSS established by the communication apparatus 3.

Specifically, the control unit 12 of the communication apparatus 1 communicates with each of the communication apparatuses 2 and 3 via the communication unit 16 and acquires STA information about each connected STA (communication apparatuses 4 to 7 in FIG. 1) using a protocol defined in the IEEE 1905.1 standard. Alternatively, the control unit 12 of the communication apparatus 1 can communicate with each of the communication apparatuses 2 and 3 via the communication unit 16 and can acquire STA information about each connected STA using a packet based on the IEEE 802.11 series.

In the present exemplary embodiment, the control unit 12 of the communication apparatus 1 determines whether an IEEE 1905.1 topology notification message including Wi-Fi EasyMesh® network configuration information has been received from the agents.

In a case where a topology notification message is not received from the agents by the communication apparatus 1 (NO in step S51), the processing proceeds to step S52. In a case where a topology notification message is received from the agents by the communication apparatus 1 (YES in step S51), the processing proceeds to step S54 skipping steps S52 and S53.

In step S52, the control unit 12 of the communication apparatus 1 transmits an IEEE 1905.1 compliant client capability query message to the agents via the communication unit 16. The client capability query message requests the agents to transmit a client capability report message to report STA information about each STA connected to the agents. The communication apparatus 1 being a controller thereby refers to the agents and acquires STA information about each STA connected to the multi-AP network 8.

In step S53, the control unit 12 of the communication apparatus 1 determines whether a client capability report message has been received from the agents via the communication unit 16. In a case where a client capability report message is received from the agents by the communication apparatus 1 (YES in step S53), the processing proceeds to step S54. In a case where a client capability report message is not received from the agents by the communication apparatus 1 (NO in step S53), the processing returns to step S53. The control unit 12 of the communication apparatus 1 then waits for a client capability report message.

In step S54, the control unit 12 of the communication apparatus 1 determines whether to perform steering to change a connection destination AP of an STA. Steering an STA to another AP equalizes the number of STA connections to a plurality of APs to distribute the load on the APs and optimizes the entire multi-AP network 8.

The entire multi-AP network 8 may be optimized by steering STAs to gather the STA connections to a single AP and permitting uplink control by trigger frame transmission with respect to a BSS network established by the AP.

User input of an instruction as to whether to steer an STA can be received via the input unit 14. Alternatively, the communication unit 16 of the communication apparatus 1 can acquire a load status of each agent using control commands defined in IEEE 802.11k or 802.11v and can dynamically steer an STA connected to a high loaded agent to another agent.

In a case where the control unit 12 of the communication apparatus 1 determines to not perform steering (NO in step S54), the processing proceeds to step S55. In a case where the control unit 12 of the communication apparatus 1 determines to perform steering (YES in step S54), the processing proceeds to step S60.

In step S55, the control unit 12 of the communication apparatus 1 determines whether the number of STAs connected to the counterpart agents (multi-AP network) is greater than or equal to the predetermined number.

Specifically, the control unit 12 of the communication apparatus 1 refers to the topology notification message received from the agent in step S51 or the client capability report message received from the agent in step S53.

The predetermined number for STA connections to the agents can statically registered in advance in the storage unit 11, or the value of the predetermined number can be changed dynamically based on a communication status of the communication unit 16.

In a case where the number of STAs connected to the counterpart agents is greater than or equal to the predetermined number (YES in step S55), the processing proceeds to step S56. In a case where the number of STAs connected to the counterpart agents is neither greater than nor equal to the predetermined number (NO in step S55), the processing proceeds to step S58.

In step S56, the control unit 12 of the communication apparatus 1 determines to cause the counterpart agents to perform uplink control by trigger frame transmission.

In step S57, the control unit 12 of the communication apparatus 1 transmits a permission message to permit trigger frame transmission to the counterpart agents.

In step S58, the control unit 12 of the communication apparatus 1 determines to prohibit the counterpart agents from transmitting trigger frames and determines to cause the counterpart agents to perform another uplink control method, e.g., CSMA/CA method.

In step S59, the control unit 12 of the communication apparatus 1 transmits a prohibition message indicating that trigger frame transmission is prohibited and uplink control is to be performed using CSMA/CA to the counterpart agents.

The permission message and the prohibition message can be transmitted by IEEE 1905.1 compliant control commands or can be transmitted by IEEE 802.11 series compliant packets.

In step S54, in the case where the control unit 12 of the communication apparatus 1 determines to perform steering, the processing proceeds to step S60. In step S60, the control unit 12 of the communication apparatus 1 determines whether the number of STA connections to the plurality of APs (agents) can be equalized to distribute the load on the APs in the multi-AP network 8.

Specifically, the control unit 12 of the communication apparatus 1 acquires load information about the load on the agents from the counterpart agents via the communication unit 16 and refers to the acquired load information, and thereby determining whether the number of STAs can be equalized.

The communication unit 16 of the communication apparatus 1 can acquire the load information about the agents from the topology notification message or the client capability report message transmitted from each agent. Alternatively, the communication unit 16 of the communication apparatus 1 can acquire the load information about the agents from each agent using the IEEE 802.11k or IEEE 802.11v protocol.

In a case where the control unit 12 of the communication apparatus 1 determines that the number of STAs can be equalized (YES in step S60), the processing proceeds to step S61. In a case where the control unit 12 of the communication apparatus 1 determines that the number of STAs cannot be equalized (NO in step S60), the processing proceeds to step S62.

In step S61, the control unit 12 of the communication apparatus 1 transmits a steering request message to an STA connected to an agent with high load via the communication unit 16. The steering request message indicates that a connection destination AP should be changed to another agent with low load by steering.

The steering request message can be transmitted using IEEE 1905.1 compliant control commands or can be transmitted using IEEE 802.11 series compliant packets.

In step S62, the control unit 12 of the communication apparatus 1 determines to perform steering to gather the connection destination APs of the STAs to one specific agent. The control unit 12 of the communication apparatus 1 transmits a steering request message to the steering target STA via the communication unit 16. The steering request message indicates that a connection destination AP should be changed to the specific agent by steering.

An agent with low load, for example, can be selected as the specific agent that is to be a steering destination.

In step S63, the control unit 12 of the communication apparatus 1 determines to cause the specific agent, to which the STAs are gathered and connected by steering, to perform uplink control by trigger frame transmission in a BSS network established by the specific agent. The control unit 12 of the communication apparatus 1 transmits a permission message, to the specific agent, to permit trigger frame transmission.

<Control Sequence of Entire Communication System in Multi-AP Network>

FIG. 6 illustrates an example of a control sequence between the communication apparatuses in a case where the controller in the multi-AP network 8 determines which one of the uplink control method using a trigger frame and the other uplink control method (e.g., CSMA/CA method) is to be executed.

Prior to step S601 in FIG. 6, AP-AP backhaul communication and AP-STA fronthaul communication have been established through processing performed in steps S401 to S403 illustrated in FIG. 4.

In step S601, the AP 1 activated as a controller receives a topology notification message from each of the APs 2 and 3 activated as an agent. The topology notification message received in step S601 includes STA information about STAs connected to the APs 2 and 3, which are agents.

In step S601, in a case where a topology notification message is not received, the AP 1 transmits a client capability query message to each of the APs 2 and 3 in step S602.

In step S603, the APs 2 and 3 each transmit a client capability report message to the AP 1 in response to a request of the client capability query message.

The client capability report message received by the AP 1 in step S603 includes STA information about STAs connected to the APs 2 and 3, which are agents, as topology information.

In step S604, the AP 1 being a controller determines whether to perform steering of an STA based on the STA information received from each of the APs 2 and 3, which are agents.

In step S605, the AP 1 determines the number of STAs connected to the agents based on the STA information received from each of the APs 2 and 3, which are agents. As described above with reference to FIG. 5, step S605 can be performed in a case where steering of an STA is not performed.

In step S604, in a case where the AP 1 determines to perform steering, the AP 1 transmits a client steering request message according to the IEEE 1905.1 protocol to each of the APs 2 and 3 in step S606. The client steering request message includes a media access control (MAC) address of a steering target STA, a MAC address of a steering destination agent, and information for connecting the STA to the steering destination agent. The information for connecting to the agent includes an extended service set identifier (ESSID), a pairwise master key (PMK), and a PMK identifier (PMKID).

The AP 1 can further perform high-speed roaming using IEEE 802.11r compliant protocols in steering an STA to a new agent.

The APs 2 and 3, which are agents, steer the STAs connected to the APs 2 and 3 to a new AP based on the client steering request messages received from the AP 1.

In step S607, the AP 1, which is a controller, determines an agent that is to perform uplink control by trigger frame transmission based on the STA information received from each of the APs 2 and 3. The AP 1 also determines an agent that is to perform uplink control (conflict control) using the CSMA/CA method based on the received STA information.

As illustrated in FIG. 1, the STAs 4 to 6 are connected to the AP 2, and the number of STA connections to the AP 2 is three or more, which is the predetermined number, so that the AP 2 is determined to perform uplink control by trigger frame transmission. In contrast, the STA 7 is connected to the AP 3, and the number of STA connections to the AP 3 is less than three, which is the predetermined number, so that the AP 3 is determined to perform uplink control using the CSMA/CA method.

In step S608, the AP 1, which is a controller, transmits a permission message to permit trigger frame transmission to the AP 2, which is an agent. The AP 2 is to be permitted uplink control by trigger frame transmission.

In step S609, in a case where the AP 2, which is an agent, receives the permission message from the AP 1, the AP 2 transmits a trigger frame to each of the STAs 4 to 6 connected to the AP 2.

There may be a case where an agent that receives the permission message and is permitted trigger frame transmission is subsequently prohibited from transmitting trigger frames due to a change in network topology and a decrease in the number of STA connections. In this case, the AP 1, which is a controller, can transmit a stop message, which is an instruction to stop trigger frame transmission, to the agent to which the permission message is previously transmitted.

In step S610, the AP 1 transmits a prohibition message to the AP 3, which is an agent that is to be prohibited from performing uplink control by trigger frame transmission and is to be caused to perform uplink control using the CSMA/CA method. The AP 3 having received the prohibition message inhibits trigger frame transmission to the STA 7 and causes the STA 7 to perform uplink control using the CSMA/CA method.

As described above, according to the present exemplary embodiment, a communication apparatus operating as a controller acquires information about STAs connected to an agent from a communication apparatus operating as the agent. In a case where the number of STAs connected to the agent is greater than or equal to the predetermined number, the communication apparatus operating as a controller transmits a permission message to permit trigger frame transmission to the STAs connected to the agent to the agent.

In contrast, in a case where the number of STAs connected to the agent is less than the predetermined number, the communication apparatus transmits a prohibition message to cause the agent to control trigger frame transmission and perform uplink control using another uplink control method to the agent.

This reduces the processing load on the AP in generating a trigger frame corresponding to uplink transmission capability of an STA for every STA, transmitting the generated trigger frame to every STA, and processing a feedback frame from each STA.

This effectively prevents a decrease in performance of a wireless network including a plurality of APs in uplink data transmission from a plurality of terminals to the APs, and thereby the network performance is optimized.

Furthermore, the performance of the entire network is optimized using the steering of STAs between a plurality of agents in combination.

Various embodiments of the present disclosure can be implemented as, for example, a system, an apparatus, a method, a program, or a recording medium (storage medium). Specifically, various embodiments are applicable to a system consisting of a plurality of devices (e.g., host computers, interface devices, image capturing apparatuses, and web applications) or an apparatus consisting of a single device.

Various embodiments of the present disclosure can also be realized by a program that realizes part of the above-described exemplary embodiments or one or more functions. Specifically, various embodiments of the present disclosure can be realized by a process of supplying the program to a system or apparatus via a network or storage medium and reading the program and executing the read program by one or more processors of a computer (or CPU or MPU) of the system or apparatus. The program can be provided stored in a computer-readable recording medium.

A form of realizing the functions of the exemplary embodiments is not limited to the execution of a program read by a computer to realize. For example, an OS operating on the computer can perform processing partially or entirely to realize the functions of the exemplary embodiments by the processing.

Various embodiments of the present disclosure prevent a decrease in performance of a wireless network formed by a plurality of APs in uplink data transmission from a plurality of terminals to the APs.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-010510, filed Jan. 27, 2020, which is hereby incorporated by reference herein in its entirety.

What is claimed is:

1. A communication apparatus comprising:
   an acquisition unit configured to acquire information about a station connected to a first access point of a plurality of access points in a wireless network including the plurality of access points;
   a determination unit configured to determine whether the number of stations connected to the first access point is greater than or equal to a predetermined number based on the information about the station acquired by the acquisition unit; and
   a control unit configured to control an operation of the first access point so that in a case where the determination unit determines that the number of stations connected to the first access point is greater than or equal to the predetermined number, a trigger frame providing the station connected to the first access point with a transmission opportunity to transmit uplink data is transmitted to the station connected to the first access point, whereas in a case where the determination unit determines that the number of stations connected to the first access point is less than the predetermined number, transmission of the trigger frame providing the station connected to the first access point with a transmission opportunity to transmit uplink data is prohibited.

2. The communication apparatus according to claim 1, wherein the communication apparatus operates as an access point that controls the first access point in the wireless network.

3. The communication apparatus according to claim 2, wherein the acquisition unit acquires the information about the station connected to the first access point by receiving topology information transmitted from the first access point.

4. The communication apparatus according to claim 2, wherein the acquisition unit acquires the information about the station connected to the first access point by referring to the first access point for topology information.

5. The communication apparatus according to claim 2, further comprising a steering unit configured to steer the station connected to the first access point to another access point,
   wherein in a case where the steering unit does not perform steering, the determination unit determines whether the number of stations connected to the first access point is greater than or equal to the predetermined number.

6. The communication apparatus according to claim 5, wherein in a case where the steering unit steers the station to a specific access point of the plurality of other access points, the control unit transmits a first message to the specific access point.

7. The communication apparatus according to claim 1, wherein the wireless network is a wireless network that supports a Wi-Fi EasyMesh® standard, the access point controlled by the other access point is an agent, and an access point that controls another access point is a controller.

8. The communication apparatus according to claim 1, wherein the information about the station is acquired from a topology notification message or a client capability report message defined in an Institute of Electrical and Electronics Engineers (IEEE) 1905.1 standard.

9. The communication apparatus according to claim 1, wherein in the case where the determination unit determines that the number of stations connected to the access point is less than the predetermined number, the control unit controls the operation of the access point to control the uplink data transmission using a carrier sense multiple access/collision avoidance (CSMA/CA) method.

10. The communication apparatus according to claim 1, further comprising a changing unit configured to change the predetermined number dynamically based on a communication status of the wireless network.

11. A method of controlling a communication apparatus, the method comprising:
    acquiring information about a station connected to a first access point of a plurality of access points in a wireless network including the plurality of access points;
    determining whether the number of stations connected to the first access point is greater than or equal to a predetermined number based on the acquired information about the station; and
    controlling an operation of the first access point so that in a case where the determining determines that the number of stations connected to the first access point is greater than or equal to the predetermined number, a trigger frame providing the station connected to the first access point with a transmission opportunity to transmit uplink data is transmitted to the station connected to the first access point, whereas in a case where the determining determines that the number of stations connected to the first access point is less than the predetermined number, transmission of the trigger frame providing the station connected to the first access point with a transmission opportunity to transmit uplink data is prohibited.

12. A non-transitory computer-readable storage medium storing a computer program for causing a computer to execute a control method of a communication apparatus, the control method comprising:

acquiring information about a station connected to a first access point of a plurality of access points in a wireless network including the plurality of access points;

determining whether the number of stations connected to the first access point is greater than or equal to a predetermined number based on the acquired information about the station; and controlling an operation of the first access point so that in a case where the determining determines that the number of stations connected to the first access point is greater than or equal to the predetermined number, a trigger frame providing the station connected to the first access point with a transmission opportunity to transmit uplink data is transmitted to the station connected to the first access point, whereas in a case where the determining determines that the number of stations connected to the first access point is less than the predetermined number, transmission of the trigger frame providing the station connected to the first access point with a transmission opportunity to transmit uplink data is prohibited.

13. A communication apparatus comprising:

at least one memory that stores a set of instructions; and at least one processor that executes the instructions, the instructions, when executed, causing the communication apparatus to perform operations comprising:

transmitting a trigger frame providing one or more stations connected to the communication apparatus with a transmission opportunity to transmit uplink data, on condition that at least the number of the stations connected to the communication apparatus is greater than or equal to a predetermined number, wherein transmission of the trigger frame providing one or more stations connected to the communication apparatus with a transmission opportunity to transmit uplink data is not performed in a case where the number of the stations connected to the communication apparatus is less than the predetermined number.

14. The communication apparatus according to claim 13, wherein the operations further comprise determining whether the number of stations connected to the communication apparatus is greater than or equal to the predetermined number based on the acquired information about the station.

15. The communication apparatus according to claim 13, wherein the operations further comprise controlling an operation of the communication apparatus so that the transmission of the trigger frame is not performed in the case where the number of the stations connected to the communication apparatus is less than the predetermined number.

* * * * *